United States Patent [19]

Seifert, Jr.

[11] 3,851,604
[45] Dec. 3, 1974

[54] DEVICE FOR METERING GRANULAR MATERIAL

[76] Inventor: Edwin A. Seifert, Jr., Rt. 1, Belgrade, Mont. 59714

[22] Filed: May 18, 1971

[21] Appl. No.: 144,436

[52] U.S. Cl.................. 111/77, 222/139, 222/298, 222/178
[51] Int. Cl............................................. A01c 5/00
[58] Field of Search .......... 222/129, 138, 139, 142, 222/177, 287, 288, 293–304, 410, 411, 414, 136, 367, 370, 178; 221/93, 124, 185, 265; 111/77

[56] References Cited
UNITED STATES PATENTS

| 138,384 | 4/1873 | Dunlap .......................... 222/301 X |
| 164,635 | 6/1875 | Bushnell ........................ 222/298 X |
| 416,498 | 12/1889 | Richardson .................... 222/139 X |
| 2,779,502 | 1/1957 | Ackerman ..................... 222/139 X |
| 3,163,333 | 12/1964 | Lindaberry .................... 222/303 X |
| R4,307 | 3/1871 | Younglove..................... 222/303 X |

FOREIGN PATENTS OR APPLICATIONS

| 1,320,794 | 2/1963 | France ................................ 222/298 |
| 36,345 | 9/1912 | Sweden.............................. 222/298 |

Primary Examiner—Robert B. Reeves
Assistant Examiner—H. Grant Skaggs, Jr.
Attorney, Agent, or Firm—Merchant, Gould, Smith & Edell

[57] ABSTRACT

Metering apparatus in which granular material from separate sources can be mixed in predetermined proportion. The device includes a delivery cylinder having a plurality of material carrying receptacles formed in its outer face which rotates within a stationary sleeve. Circumferentially aligned inlets and outlets in the sleeve define paths of travel for the granular material, the axial width of each path being variable by selective positioning of a cylindrical band member which rotates with the delivery member and is axially slidable thereon.

20 Claims, 5 Drawing Figures

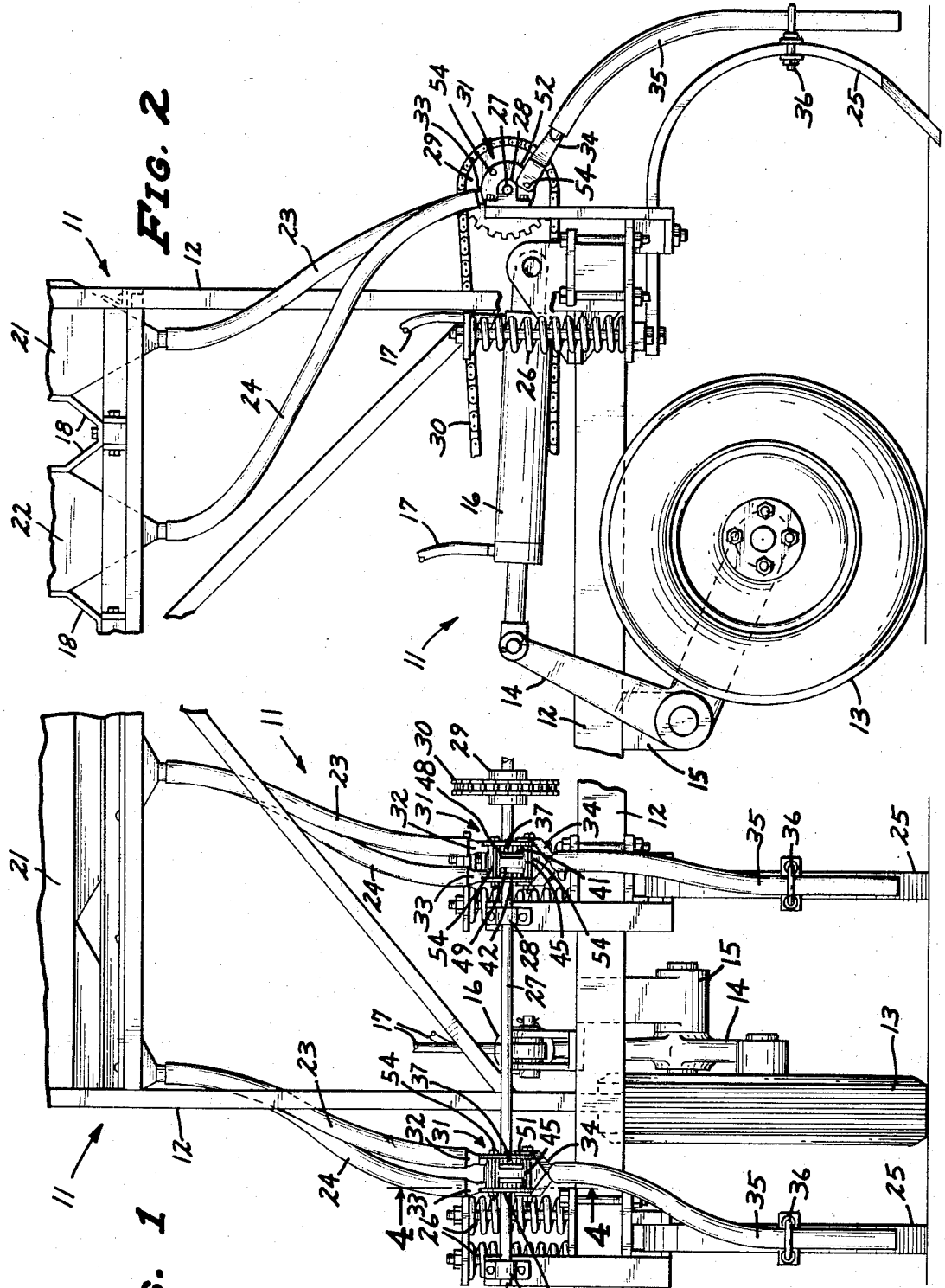

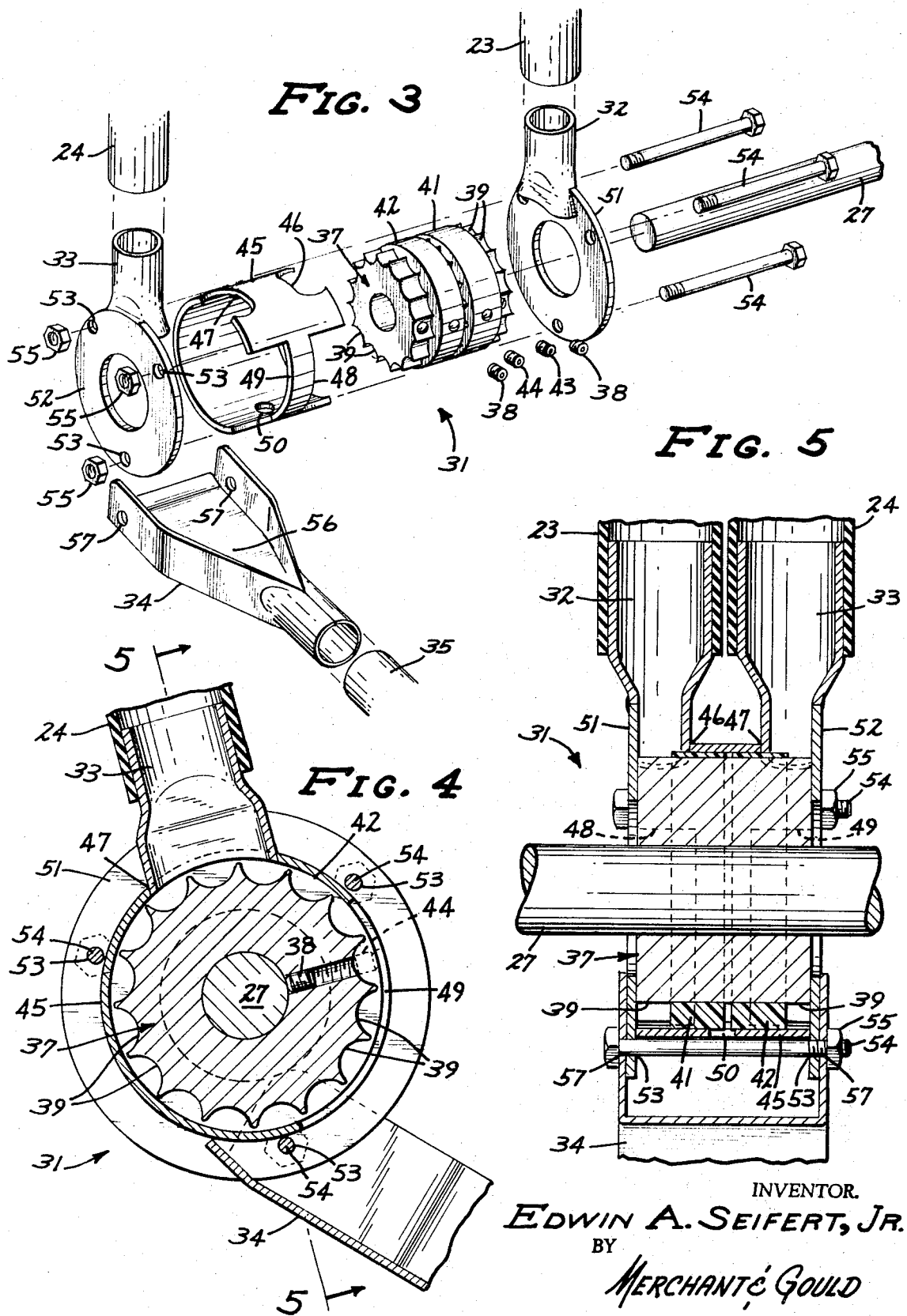

DEVICE FOR METERING GRANULAR MATERIAL

The invention relates generally to metering devices, and is specifically directed to a device capable of metering and proportioning one or more types of granular material.

The seeding of grain and other granular materials for the production of agricultural plants is usually accomplished through the use of seeding mechanisms which operate in conjunction with other agricultural machinery. Typically, a grain seeding device consists of a wheeled housing adapted to be drawn behind such agricultural machinery, and which carries a hopper for the grain and a metering mechanism that operates as a function of wheel revolution. With this type of device, the metering mechanism is connected directly to the hopper, and proper operation is dependent on this structural relationship.

In view of limitations of space, machine maneuverability and hopper capacity, as well as difficulties arising from the seeding of a plurality of rows, I have found that location of the hopper is not necessarily the ideal location for the metering apparatus. Further, if it is desired to fertilize simultaneously with seeding of the grain, which is the most efficient approach to seeding, additional machinery is required which adds an additional degree of complication to the seeding process.

In an endeavor to provide a solution to these problems, I have invented a seeding machine which employs a plurality of unique, self-contained metering devices, each of which is mounted on the machine at a point entirely remote from a grain hopper or other seed source. The metering devices are commonly mounted on a rotating shaft; and, preferably, their speed of rotation is variable to provide one method of controlling the flow of grain to furrowed ground.

The metering of grain is accomplished within the device by varying the effective width of a circumferential path on a rotating delivery wheel, and the use of a plurality of inlets with corresponding circumferential paths enables the device to selectively meter and mix grain and fertilizer or any combination of granular materials to predetermined proportions.

Because the metering devices are self-contained and independently sealed it is possible to supply each of the respective inlets from a common hopper, which greatly simplifies the task of keeping each device supplied with seed. Further, with all metering devices mounted on a single rotating shaft, it is possible, through varying shaft speed, to effect a change in grain flow with a single adjustment, rather than the individual adjustment of several distinct units.

BRIEF DESCRIPTION OF THE DRAWINGS

FIG. 1 is a fragmentary rear elevation of a grain seeding machine embodying the inventive principle;

FIG. 2 is a fragmentary side elevation of the grain seeding machine;

FIG. 3 is an exploded perspective view of a metering device used on the grain seeding machine;

FIG. 4 is an enlarged sectional view of the metering device, taken generally along the line 4—4 of FIG. 1; and FIG. 5 is a sectional view of the metering device taken along the line 5—5 of FIG. 4.

DESCRIPTION OF THE PREFERRED EMBODIMENT

FIGS. 1 and 2 disclose a grain seeding machine represented generally by the numeral 11, which comprises a frame assembly 12 supported by a pair of wheels 13, only one of which is shown. Wheel 13 is mounted on one end of a crank member 14, an intermediate portion of which is pivotally connected to a lug member 15 forming part of the frame assembly 12. The opposite end of crank member 14 is pivotally connected to a piston-cylinder hydraulic actuator 16, which also is supported by frame assembly 12. Actuator 16 includes supply and return lines 17 which are connected to a source of hydraulic fluid (not shown). The supply of hydraulic fluid to actuator 16 in the well known manner operates the crank member 14 to control the position of wheel 13 and thereby raise or lower frame assembly 12.

Frame assembly 12 includes an upper portion having a plurality of bracket members 18 which support a hopper 21 for grain and a hopper 22 for fertilizer as shown. Each of the hoppers 21, 22 has a supply tube, designated 23 and 24, respectively, which supplies the associated granular material to a point therebelow, as described in further detail below.

Clamped to the rear portion of frame assembly 12 is a furrow forming member or grain drill 25, the upper end of which is operably connected to a set of springs 26 to maintain a desired bias on the drill member 25.

Also disposed at the rear of frame assembly 12 is a shaft 27 which is rotatably supported by a plurality of bearing housings 28. A sprocket member 29 is affixed to shaft 27 and provides rotational energy thereto through a chain 30. The driving member to which chain 30 is connected is not shown, but it is preferably capable of providing a range of rotational speeds to shaft 27. Alternatively, a plurality of different sized sprockets combined with a chain tensioning device could be employed to effect variations in the rotational speed of shaft 27.

A plurality of metering devices represented generally by the numeral 31 are operably mounted on shaft 27. Each metering device includes a grain inlet 32 to which the grain tube 23 is attached, a fertilizer inlet 33 to which the fertilizer tube 24 is attached and an outlet 34 from which a flexible tube 35 projects to deliver a proportioned mixture of grain and fertilizer to the previously formed furrow below. For purposes of alignment, outlet tube 35 is affixed to the grain drill 25 by a U-bolt 36.

Referring additionally to FIGS. 3–5, metering device 31 consists of a delivery wheel 37 which is affixed to shaft 27 by a pair of set screws 38. Delivery wheel 37 is generally cylindrical in shape, the outer surface of which is formed with axially extending concave pockets or receptacles 39 which receive and carry granular material.

Axially slidable on the outer surface of delivery wheel 37 are a pair of band members 41, 42, the inside surfaces of which are formed to structurally complement the receptacles 39. A set screw 43 is employed to hold band member 41 in a predetermined axial position on delivery wheel 37, and a set screw 44 provides the same function for band member 42.

Encircling the delivery wheel 37 and band members 41, 42 is a cylindrical sleeve 45, the inside diameter of which is chosen to permit substantial sliding engagement with band members 41, 42, but to define an annular gap with delivery wheel 37 as best shown in FIG. 4. Cylindrical sleeve 45 includes recessed portions 46 and 47 to define granular material inlets, and a second pair of recessed portions 48, 49 serve as outlets for the granular material. As shown, recessed portion 48 is circumferentially aligned with recessed portion 46, and a similar structural relationship exists between recessed portions 49 and 47. Thus, the sleeve member 45, in combination with delivery wheel 37 and band members 41, 42, defines a pair of circumferential paths of predetermined axial width through which the granular material may travel while in the confines of receptacles 39. It is evident that this axial width may be varied by the set screw adjustment of band members 41 and 42, as discussed in further detail below.

Cylindrical sleeve 45 also includes an aperture 50 for the removal of fines that may become trapped between band members 41, 42 and the inner surface of sleeve 45.

Each of the granular inlets 32, 33 terminates in a mouth which, in side elevation, arcuately conforms to and slidably engages its associated band member. In rear elevation (see FIG. 5), inlets 32, 33 converge to define a somewhat restricted flow channel. This structural formation of the mouth of inlets 31 and 32 also conforms to recesses 46, 47 to enable the transfer of granular material to delivery wheel 37 without loss or waste.

As best shown in FIG. 3, inlet 32 is rigidly affixed to a circular plate 51 having a centrally disposed opening formed therein to prevent its engagement with shaft 27. Inlet 33 is attached to a similar circular plate 52. Each of the plates 51, 52 includes spaced bolt holes 53 which are aligned to receive clamping bolts 54 and nuts 55.

Also as best seen in FIG. 3, outlet 34 forms capturing tray or trough 56 which, by virtue of bolt holes 57 formed in its upturned sides, is carried by one of the clamping bolts between circular plates 51 and 52, immediately below recessed portions 48 and 49. Thus, outlet 34 receives metered granular material from each circumferential path and permits the mixture thereof as the combined granular material passes into flexible tube 35 and on to the previously formed furrow.

In the operation of grain seeding machine 11, hopper 21 is filled with seeding grain and hopper 22 with a commercially available granular fertilizer. For a given rotational speed of shaft 27, band members 41 and 42 are adjusted to respectively meter grain and fertilizer in the desired proportion. The rate at which the grain fertilizer mixture is supplied to the ground is controlled by selecting the proper rotational speed of shaft 27 in the manner described above.

I claim:

1. Apparatus for delivering a metered mixture of two types of granular material, comprising:
   a. a rotatable shaft;
   b. a generally cylindrical delivery member of predetermined length mounted for rotation on the shaft, the surface of the cylindrical member having formed therein a plurality of pockets for receiving and carrying granular material;
   c. a stationary cylindrical sleeve member encircling the delivery member and sized to define an annular gap therebetween, the sleeve member having first and second inlets of predetermined size and shape and first and second outlets;
   d. the inlet and outlet openings being circumferentially aligned in pairs to determine a path of predetermined axial width for each type of granular material;
   d. a band member for each inlet-outlet pair, the band member being disposed in said annular gap and axially slidable on the delivery member to vary the associated axial path width and thereby vary the quantity of granular material delivered from the inlet to the outlet;
   e. a plate member sealably engaging each end of the sleeve member;
   f. and an inlet conduit secured to each plate member in communication with the associated inlet and terminating in a mouth conforming to said associated inlet to permit the delivery of granular material therethrough.

2. The apparatus as defined by claim 1, wherein each band member is rotatable with the delivery member.

3. The apparatus as defined in claim 1, and further comprising means for retaining each band member in a preselected axial position.

4. The apparatus as defined by claim 1, and further comprising collector means communicating with each of the sleeve member outlets for receiving and delivering granular material to a predetermined point.

5. The apparatus defined by claim 4, wherein the collector means is carried by the end plates and disposed below said outlets of the sleeve member to commonly receive granular material therefrom and to deliver mixed granular material to said predetermined point.

6. The apparatus as defined by claim 1, wherein the pockets are concave and extend axially of the delivery wheel.

7. The apparatus as defined by claim 6, wherein the inner surface of each band member structurally complements said delivery wheel pockets for axially slidable movement relative thereto and rotation therewith.

8. The apparatus as defined by claim 1, wherein the rotational speed of the rotatable shaft is variable.

9. Apparatus for delivering a metered mixture of at least two types of granular material to a plurality of points, comprising:
   a. frame means;
   b. a hopper for each of said types of granular material, the hoppers being carried by the frame means;
   c. means associated with each of said points for metering and mixing said granular material in a predetermined fashion, each of said metering and mixing means having an inlet means for receiving each type of granular material and an outlet means for delivering said metered mixture to the associated point, each metering and mixing means comprising i. a rotatable shaft;
   ii. a generally cylindrical delivery member of predetermined length mounted for rotation on the shaft, the surface of the cylindrical member having formed therein a plurality of pockets for receiving and carrying granular material;

iii. a stationary sleeve member encircling the delivery member and sized to define an annular gap therebetween, the cylindrical sleeve member having an inlet opening establishing communication between each inlet means and the delivery member, and an outlet opening establishing communication between the delivery member and the outlet means, the inlet and outlet openings being circumferentially aligned in pairs to define a path of predetermined axial width for each type of granular material;

iv. and a band member for each inlet-outlet pair, the band members being disposed in said annular gap and axially slideable on the delivery member to vary the associated axial path width and thereby vary the quantity of granular material delivered from the inlet opening to the outlet opening;

d. and conduit means for delivering granular material from each of said hoppers to the appropriate inlet means of each metering and mixing means.

10. The apparatus defined by claim 9, wherein the frame means is wheelably supported, and the metering and mixing means operate as a function for frame means movement.

11. The apparatus defined by claim 9, and further comprising furrow forming means associated with each of said metering and mixing means, the outlet means being disposed to deposit the metered mixture into said furrow.

12. The apparatus as defined by claim 9, wherein the cylindrical delivery members of the several metering and mixing means are commonly mounted on a single rotatable shaft.

13. The apparatus defined by claim 12, wherein the speed of said single rotatable shaft is variable.

14. The apparatus defined by claim 9, wherein each band member is rotatable with its associated cylindrical delivery member.

15. The apparatus as defined by claim 9, and further comprising means for retaining each of said band members in a preselected axially position.

16. The apparatus as defined by claim 9, wherein the pockets of said delivery member are concave and extend axially of the delivery wheel.

17. The apparatus as defined by claim 16, wherein the inner surface of each band member structurally complements said delivery wheel pocket for axially slideable movement relative thereto and rotation therewith.

18. The apparatus as defined by claim 9, which further comprises a plate member sealably engaging each end of the sleeve member.

19. The apparatus as defined by claim 18, wherein the conduit means comprises:

a. an inlet conduit secured to each plate member in communication with the associated inlet opening and terminating in a mouth conforming to said associated inlet opening;

b. a first tube interconnecting one of said inlet conduits with one of said hoppers;

c. and a second tube interconnecting the other of said inlet conduits with the other of said hoppers.

20. The apparatus as defined by claim 19, wherein the outlet means comprises a collecting receptacle carried by said end plates and disposed below the outlet openings of the sleeve member to commonly receive granular material therefrom, and a flexible tube connected to said collecting receptacle and projecting downwardly therefrom to deliver mixed granular material to one of said points.

* * * * *